United States Patent [19]

de Jong et al.

[11] Patent Number: 4,483,975

[45] Date of Patent: Nov. 20, 1984

[54] COPOLYETHERESTERAMIDES, PROCESS FOR THEIR PRODUCTION AND THEIR USE FOR THE HEAT-SEALING OF TEXTILES

[75] Inventors: Eduard de Jong, Troisdorf-Eschmar; Karl-Heinz Hapelt, Bonn; Helmut Knipf, Mechernich, all of Fed. Rep. of Germany

[73] Assignee: Plate Bonn Gesellschaft mit beschrankter Haftung, Bonn, Fed. Rep. of Germany

[21] Appl. No.: 564,085

[22] Filed: Dec. 21, 1983

[30] Foreign Application Priority Data

Dec. 23, 1982 [DE] Fed. Rep. of Germany ....... 3247755

[51] Int. Cl.$^3$ ...................... C08G 63/44; C08G 69/00; C08G 69/44
[52] U.S. Cl. .................................. 528/288; 525/420; 525/425; 525/432; 525/436; 528/289; 528/300; 528/301; 528/302
[58] Field of Search ............... 525/420, 425, 432, 436; 528/288, 289, 300, 301, 302

[56] References Cited

U.S. PATENT DOCUMENTS

| | | | |
|---|---|---|---|
| 4,062,907 | 12/1977 | Sublett | 528/301 X |
| 4,093,492 | 6/1978 | Raabe et al. | 528/288 X |
| 4,156,774 | 5/1979 | Buxbaum et al. | 528/301 X |
| 4,217,256 | 8/1980 | Peerman et al. | 528/289 |
| 4,307,227 | 12/1981 | Meyer et al. | 528/288 |
| 4,330,670 | 5/1982 | Sublett | 528/301 |
| 4,380,622 | 4/1983 | Chiba et al. | 528/288 |
| 4,438,240 | 3/1984 | Tanaka et al. | 525/420 |

*Primary Examiner*—Lucille M. Phynes
*Attorney, Agent, or Firm*—Mandeville and Schweitzer

[57] ABSTRACT

Copolyetheresteramides containing, incorporated by condensation, 20 to 40% by weight of caprolactam and/or ε-aminocaproic acid, 10 to 30% by weight of an equimolecular mixture of adipic acid and primary aliphatic and/or cycloaliphatic $C_6$ to $C_{25}$ diamines, 10 to 30% by weight of an equimolecular mixture of azelaic or sebacic acid and primary aliphatic and/or cycloaliphatic $C_6$ to $C_{25}$ diamines and 20 to 40% by weight of an equimolecular mixture of decanedicarboxylic and/or brassylic acid and primary aliphatic and/or cycloaliphatic $C_6$ to $C_{25}$ diamines, always related to the total quantity of the polyamide-forming components, and in which, for 65 to 90% by weight of the total quantity of the polyamide-forming components, there are 10 to 35% by weight of the equimolecular quantities of saturated aliphatic linear dicarboxylic acids, having 6 to 13 C-atoms, and poly(alkylene oxide diols) as polyetherester-forming component, and a process for their preparation. The copolyetheresteramides are used for the heat-sealing of textiles.

8 Claims, No Drawings

COPOLYETHERESTERAMIDES, PROCESS FOR THEIR PRODUCTION AND THEIR USE FOR THE HEAT-SEALING OF TEXTILES

BACKGROUND OF THE INVENTION

The present invention relates to copolyetheresteramides, derived from caprolactam and/or ε-aminocaproic acid and other polyamide-forming monomers as amide-forming components and equimolecular quantities of saturated aliphatic linear dicarboxylic acids, having 6 to 13 C-atoms, and poly(alkylene oxide diols) as etherester-forming components.

European Patent Application No. A 00 17 112 (Bayer) discloses copolyetheresteramides, containing 50 to 80% by weight of ε-caprolactam and further polyamide-forming monomers and equimolecular quantities of saturated aliphatic linear dicarboxylic acids and poly(alkylene oxide diols), incorporated by polycondensation. These copolyetheresteramides are said to find application as high quality raw materials for thermoplastic adhesives, the field of the shoe industry being the only particular intended use indicated. These copolyetheresteramides are unsuitable as hot-melt adhesives for textiles, because they are difficult to process into powders and, in particular, do not yield satisfactory adhesion values, particularly after dry cleaning and laundry treatment, which is an absolute pre-requisite for useful hot-melt adhesives for textiles.

Similarly, West German Patent Application No. A 2 523 991 discloses copolyetheresteramides, which, however, do not contain any caprolactam and/or ε-aminocaproic acid incorporated by condensation. The copolyetheresteramides described therein can be used for moulding and extrusion processing. There is no reference to the use as hot-melt adhesives, particularly for textiles. The copolyetheresteramides, described in this literature reference, are not suitable as hot-melt adhesives for textiles, because they do not yield adequate adhesion values at the hot-sealing temperatures to be applied in the glueing of textiles.

West German Patent Application No. A 29 49 064 discloses copolyetheresteramides, which are to be used as hot-melt adhesives for textiles. These, however, contain lauric lactam as the essential amide-forming component. The disadvantage of these products is that lauric lactam is a relatively inaccessible and, therefore, expensive polyamide-forming substance and that the preparation of the copolyamides has to be carried out at high pressures and temperatures. The copolyetheresteramides of West German Patent Application No. A 29 49 064 have the advantage, by comparison with the known polyamides, employed as hot-melt adhesives for textiles—compare, inter alia, West German Patent Application No. C 1 253 449)—that they produce a softer handle in the glued textiles.

SUMMARY OF THE INVENTION

The present invention is based on the problem of discovering hot-melt adhesives for glueing textiles, which produce a softer handle, by comparison with the polyamide hot-melt adhesives known from West German Patent Application No. C 1 253 449, but can be produced easily from readily available monomers. It has been believed so far that this problem can only be solved if substantial quantities of lauric lactam are used as polyamide-forming substance—compare West German Patent Application No. A 29 49 064. It has now been surprisingly found that this is not the case and that the above problem is solved by means of copolyetheresteramides, produced with caprolactam.

Therefore the above problem is solved by means of copolyetheresteramides derived from caprolactam and/or ε-amino-caproic acid and other polyamide-forming monomers as amide-forming component and equimolecular quantities of saturated aliphatic linear dicarboxylic acids, having 6 to 13 C-atoms, and poly(alkylene oxide diols) as polyetherester-forming components, characterised in that they contain, incorporated by polycondensation,

- 20 to 40% by weight of caprolactam and/or ε-aminocaproic acid,
- 10 to 30% by weight of an equimolecular mixture of adipic acid and primary aliphatic and/or cycloaliphatic $C_6$ to $C_{25}$ diamines,
- 10 to 30% by weight of an equimolecular mixture of azelaic and/or sebacic acid and primary aliphatic and/or cycloaliphatic $C_6$ to $C_{25}$ diamines and
- 20 to 40% by weight of an equimolecular mixture of decanedicarboxylic and/or brassylic acid and primary aliphatic and/or cycloaliphatic $C_6$ to $C_{25}$ diamines, always related to the total quantity of the polyamide-forming components, and that, for 65 to 90% by weight of the total quantity of the polyamide-forming components, there are 10 to 35% by weight of the equimolecular quantities of saturated aliphatic linear dicarboxylic acids, having 6 to 13 C-atoms, and poly(alkylene oxide diols) as polyetherester-forming component.

Preferably, the quantities of the above-mentioned polyamide-forming components, in the above sequence, are the following:

- 25 to 35% by weight of 6,
- 15 to 25% by weight of 6.6,
- 15 to 25% by weight of 6.9 and/or 6.10 and
- 25 to 35% by weight of 6.12 and/or 6.13.

The above abbreviations "6" denote the polyamide-forming components in the internationally customary manner of abbreviation. They indicate that the component has the corresponding number of C-atoms. If two numbers are separated by a point, the first number denotes the diamine component and the second number the dicarboxylc acid component.

The copolyetheresteramides are prepared by polycondensation of the above-mentioned starting compounds.

A further subject of the invention is the use of the above copolyetheresteramides for heat-sealing textiles or, respectively, a process for heat-sealing textiles in a manner that is known per se, in which, however, the copolyetheresteramides described above are used as hot-melt adhesives.

Although the copolyetheresteramides described do not contain any lauric lactam, incorporated by condensation, they surprisingly possess very great adhesive strength, even after dry cleaning and after laundering operations, which is surprising to those skilled in the art. The glued textiles have a pleasant soft handle. The glued zones are elastic.

DETAILED DESCRIPTION OF THE INVENTION

Preferably, the equimolecular mixture of azelaic acid and diamine is used as the third component.

Decanedicarboxylic acid is preferred as the carboxylic acid of the fourth component.

Hexamethylene diamine is preferred among the diamines. It can be employed exclusively. It is also possible, however, to employ mixtures of diamines, in which case hexamethylene diamine forms preferably a proportion of at least 50% by weight, with special preference for at least 70% by weight, related to the total quantity of diamines. Other diamines that may be mentioned are isophorone diamine (IPD), 1,3-bis (aminomethyl)cyclohexane, nonamethylene diamine, 3-methyl-pentamethylene diamine and dodecane diamine. Two-nucleus diamines can also be employed, such as 4,4'-diamino-3,3'-dimethyl-dicyclohexylmethane, 4,4'-diamino-3,3', 5,5'-tetramethyl-dicyclohexylmethane, 4,4'-diamino-dicyclohexylpropane and, preferably, 4,4'-diamino-dicyclohexylmethane and diamino-dicyclohexylmethane isomer mixtures, at least 75% of which consist of the 4,4'-isomer. Evidently, mixtures of the diamines mentioned are also suitable. Particular properties of the end-products may be influenced by the choice of diamines, as is also known already in the copolyamide field.

The products disclosed in the above-mentioned publications can be employed as the poly(alkylene oxide diols). Poly(alkylene oxide diols), having a molecular weight of between 400 and 2000, are preferred. Preferably, the lower limit for the molecular weight is 500. The upper limit is preferably 1200.

These poly(alkylene oxide diols) are preferred that contain between the oxygen atoms alkylene groups having two or four C-atoms. Linear chains are preferred. Polyethylene glycol is particularly preferred.

Similarly, the saturated aliphatic linear dicarboxylic acids employed, having 6 to 13 C-atoms, are the dicarboxylic acids disclosed in the literature references, mentioned at the beginning. Brassylic acid and, particularly, decanedicarboxylic acid are preferred.

The copolyetheresteramides melt within the range of about 90° to 160° C., determined by the DSC method (Differential Scanning Calorimetry method). The melting point lies preferably below 150° C. Low-melting products are particularly suitable for glueing heat-sensitive textiles.

Appropriately, the copolyetheresteramides have a solution viscosity $\eta$ relative of 1.3 to 1.75. The lower limit is preferably 1.45. The upper limit is appropriately 1.65. The solution viscosity is measured in a 0.5% solution in m-cresol at 20° C., (Ostwald viscometer).

The melt viscosity at 180° C. lies appropriately within the range of 400 to 5000 dPa.s. The lower limit is preferably about 800 dPa.s. The upper limit is preferably about 4000 dPa.s, measured with the rotation viscometer RV 2, plate and cone (P/C) system.

The copolyetheresteramides are prepared in the manner known to those skilled in the art from the publications mentioned at the beginning. Appropriately, the copolyamide-forming components and the saturated aliphatic linear dicarboxylic acids, having 6 to 13 C-atoms, are first reacted with each other, with formation of a copolyamide having terminal carboxyl groups. The reaction takes place appropriately at temperatures of about 180° to 300° C., preferably about 200° to 260° C. Since lauric lactam is not included in the formulation, the reaction can be carried out at normal pressure. Slightly elevated pressures can, however, be applied for accelerating the reaction. Polycondensation is effected, in the usual way, by addition of small quantities of water. In accordance with the state of the art, the reaction is carried out with exclusion of air, that is to say under an inert gas atmosphere. Preparation of the polyamide takes place within about 2 to 5 hours, water being dissociated, preferably during about 2.5 to 3.5 hours. Subsequently, the poly(alkylene oxide diol) is added and a customary catalyst and the polycondensation is carried out at reduced pressure, appropriately within the range of about 100 mbar to 1 mbar. The lowest possible pressure is advantageous, because the reaction time is shortened. The temperatures for after-condensation lie within the range of about 180° to 300° C., preferably about 200° to 260° C. The after-condensation is carried out at the pressures mentioned for about 0.5 to 5 hours, preferably for about 1 to 3 hours, the particular time period depending on the remaining conditions applied (temperature, pressure, catalyst) and the desired degree of polymerisation, that is to say the desired viscosity.

Theoretically, the process can also be worked at pressures above 100 mbar, but, in that case, the reaction period is lengthened considerably, which is undesirable, as a rule, since decomposition phenomena may occur.

The catalysts employed are those known for this reaction according to the state of the art. Dialkyl zirconates are preferred, the alkyl groups being able to be branched or linear and containing 1 to 24 C-atoms. Tetraalkyl orthotitanates can also be employed. Alkyl group having 4 C-atoms are preferred, especially n-butyl compounds. The quantity of catalyst lies within the known range of about 0.01 to 5% by weight, related to the weight of the reaction mixture. Preferably, the quantity of catalyst is below about 1% by weight.

Production can also be effected in such a way that all the starting products are first heated to the above-mentioned temperatures of about 180° to 300° C., preferably about 200° to 260° C., for a period of about 2 to 5 hours, with dissociation of water, preferably for about 2.5 to 3.5 hours. Subsequently, after-condensation is carried out under reduced pressure within the range indicated above and at the temperatures indicated above for the above-mentioned period, until the desired degree of polymerisation is attained.

The copolyetheresteramides according to the invention may also contain, in addition, small quantities of other polyamide-forming substances than those mentioned above, incorporated by condensation. For reasons of easy availability and satisfactory reproducibility of preparation and production of products of constant properties, however, it is generally not indicated to add yet further components.

With the aid of the copolyetheresteramides according to the invention, textiles of various kinds can be glued together. Examples of these are natural materials and/or synthetic materials, such as wool, silk, cotton or polyesters, polyamides and the like. Hides and the like can also be glued on as substrates. A copolyetheresteramide according to the invention, preferably in powder form, is placed between the surfaces that are to be glued together. Naturally, the copolyamide may also be employed in the form of films, threads, short-cut threads or fleeces. It is also possible to prepare dispersions from powders in a manner that is known per se and to use them for heat-sealing. If powders or dispersions are employed, they are applied to one of the substrates to be glued by means of known machines and slightly sintered by application of elevated temperatures, so that the hot-melt adhesive adheres firmly to the substrate. The latter can may be stored and dispatched as such and be glued to the desired other substrate later on. The substrates may, however, be glued together immediately. Glueing is effected with application of elevated temperature and pressure. The pressing temperature depends, above all, on the heat-sensitivity of the substrate, but has to be sufficiently high for melting and glueing to take place. On cooling to room temperature, solidification occurs, with joining of the glued substrates.

The preparation of the powders is effected in the same way as is known with polyamide hot-melt adhesives. The granulate first obtained is milled in the cold and classified. As in the case of polyamide hot-melt adhesives for textiles, the range of particle size is appropriately 60 to 200 μm for the so-called powder point process, appropriately 200 to 500 μm for the powder dusting process and, for the paste point process (dispersions), the range of particle size is employed below about 80 μm. Customary additives may be added to the powder, such as metal soaps, for example calcium stearate or zinc stearate, optical brightening agents, stabilisers, such as sterically hindered phenols or other additives as are customary for polyamide hot-melt adhesives. The dispersions can have the composition customary for polyamide hot-melt adhesives, that is to say anti-settling agents, dispersing agents and the like.

An advantage of the copolyetheresteramides of the invention is that the additional use of plasticisers is not necessary. If desired, however, plasticisers can also be added, particularly to dispersions. Suitable plasticisers are, for example, sulphonic acid derivatives, as described in U.S. patent application No. A 4,093,492, columns 3 and 4.

Appropriately, the copolyetheresteramides have a melt index MFI at 150° C. at 2.16 kp according to DIN 53 735 of about 5 to 40 g/10 minutes. The upper limit is appropriately about 30, the lower limit appropriately about 7.

EXAMPLE 1

The following components are weighed into a closed autoclave, provided with an agitator and a column:
 6.30 kg caprolactam
 2.30 kg adipic acid
 2.60 kg azelaic acid
 5.90 kg decanedicarboxylic acid and
 5.62 kg hexamethylene diamine 100% (employed as an 80% aqueous solution).

After flushing the reactor with nitrogen, the closed system was heated to 230° C., with stirring. During this time, a pressure of 6 bar was established, which is being maintained by pressure release, if necessary, for two hours. After this 2-hour pre-condensation, the pressure is slowly reduced to normal pressure by opening a valve. Subsequently, the residual water was distilled off within 1 hour. After addition of
 7.30 kg polytetramethylene glycol (molecular weight 1000) (PTMG) and
 0.07 kg di-n-butyl zirconate,
the product was heated to 250° C. in a gentle nitrogen stream within 30 minutes. Subsequently, the product was submitted to after-condensation at a pressure of 1 mbar within 35 minutes. The polycondensate obtained was spun through an orifice nozzle into a water bath and granulated. The physical values measured are compiled in Table 1.

The granulate was milled in a commercial cold milling unit to powder having the following particle size distribution:
 less than 63 μm = 28.0% by weight
 less than 80 μm = 34.4% by weight
 less than 100 μm = 41.2% by weight
 less than 150 μm = 58.4% by weight
 less than 200 μm = 72.4% by weight
 less than 300 μm = 90.8% by weight
 less than 400 μm = 98.4% by weight
 less than 500 μm = 99.6% by weight After separation of the individual fractions, the particle size range of 80 to 200 μm was applied to a commercial cotton interlining fabric by means of a commercial powder point unit.

The coated interlining fabric was iron-pressed together with a commercial surface fabric (55% polyester, 45% cotton) under pressure and at elevated temperature. The glued parts were washed 5 times at 60° C. with a commercial detergent.

Further parts were subjected to 5 runs of dry cleaning.

The untreated, washed and cleaned samples were tested for resistance to separation according to DIN 54 310. The results obtained are set out in Table 1.

EXAMPLE 2

Following the method described in Example 1, a polyetheresteramide was prepared from the following raw materials:
 4.20 kg caprolactam
 1.56 kg adipic acid
 1.73 kg azelaic acid
 4.82 kg decanedicarboxylic acid
 3.72 kg hexamethylene diamine 100% (employed as an 80% aqueous solution)
 3.97 kg polyethylene glycol (molecular weight 450) (PEG) and
 0.07 kg di-n-butyl zirconate.

In this case, after-condensation took about 60 minutes. The polycondensate obtained was milled, as indicated in Example 1, and gave the following particle size distribution:
 less than 63 μm = 24.4% by weight
 less than 80 μm = 31.6% by weight
 less than 100 μm = 38.8% by weight
 less than 150 μm = 54.8% by weight
 less than 200 μm = 68.4% by weight
 less than 300 μm = 88.0% by weight
 less than 400 μm = 97.6% by weight
 less than 500 μm = 99.6% by weight The values determined in the subsequent textile performance testing of the 80 to 200 μm fraction are set out in Table 1. It possesses particularly good steam resistance.

EXAMPLE 3

The following components were weighed onto an autoclave, provided with a column and an agitator:
 6.30 kg caprolactam
 2.30 kg adipic acid
 2.60 kg azelaic acid
 5.90 kg decanedicarboxylic acid and
 5.62 kg hexamethylene diamine 100% (employed as an 80% aqueous solution).

After flushing the reactor with nitrogen, the system was heated to 230° C., with stirring, and pre-condensation was carried out for about 3 hours at this temperature, the reactor being flushed with a gentle nitrogen stream after about 2 hours.

Subsequently, after addition of 7.30 kg polytetramethylene glycol (molecular weight 1000) (PTMG) and 0.07 kg di-n-butyl zirconate, the temperature was raised to 250° C. within about 45 minutes. After-condensation was carried out for about 45 minutes at this temperature and at a pressure of 1 mbar. The polycondensate obtained has the same properties as that obtained in Example 1.

TABLE 1

|  | Example 1 | | | Example 2 | | |
|---|---|---|---|---|---|---|
| Composition in % by weight | 30% 6 | | | 30% 6 | | |
|  | 20% 6.6 | | | 20% 6.6 | | |
|  | 20% 6.9 | | | 20% 6.9 | | |
|  | 30% 6.12 | | | 30% 6.12 | | |
|  | 70% PA | | | 70% PA | | |
|  | 30% PTMG 12 | | | 30% PEG 12 | | |
| Melting range (optical) °C. | 135–137 | | | 131–136 | | |
| η rel of 0.5% solution in m-cresol @ 20° C. | 1.38 | | | 1.66 | | |
| Melt viscosity at 180° C. in dPa.s; Rotoviscometer RV2, system P/C | 1200 | | | 3900 | | |
| MFI at 150° C. in g/10 min. at 2.16 kp DIN 53 735 | 23 | | | 9 | | |
| Textile performance tests | NTS | 5 × 60° | 5 × DT | NTS | 5 × 60° | 5 × DT |
| Ironing machine | | | | | | |
| plate time groove | | | | | | |
| 140° 15 sec. 133° | 13 | 13 | 15 | 14 | 13 | 13.5 |
| 150° 15 sec. 143° | 13 | 13 | 13 | 18 | 16.5 | 17.5 |
| 160° 15 sec. 152° | 13 | 13 | 15 | 21 | 21 | 22.5 |
| weight applied g/m² | 17 g ± 2 g | | | 17 g ± 2 g | | |
| Pressing pressure bar | 0.35 | | | 0.35 | | |

NTS = normal tearing strength in N/5 cm
5 × 60° = tearing strength after 5 washings at 60° C. in N/5 cm
5 × DT = tearing strength after dry cleaning for 5 sec. in N/5 cm The composition is understood as follows:
6 = caprolactam;
6.6 = hexamethylene diamine/adipic acid;
6.9 = hexamethylene diamine/azelaic acid;
6.12 = hexamethylene diamine/decanedicarboxylic acid
PA = polyamide

We claim:

1. Copolyetheresteramides comprising, incorporated by polycondensation,
   I. from 65 to 90% by weight of a polyamide-forming component which includes:
   (a) 20 to 40% by weight of caprolactam and/or ε-aminocaproic acid,
   (b) 10 to 30% by weight of an equimolecular mixture of adipic acid and primary aliphatic and/or cycloaliphatic $C_6$ to $C_{25}$ diamines,
   (c) 10 to 30% by weight of an equimolecular mixture of azelaic and/or sebacic acid and primary aliphatic and/or cycloaliphatic $C_6$ to $C_{25}$ diamines, and
   (d) 20 to 40% by weight of an equimolecular mixture of decanedicarboxylic and/or brassylic acid and primary aliphatic and/or cycloaliphatic $C_6$ to $C_{25}$ diamines, and
   II. 10 to 35% by weight of a polyetherester-forming component which includes equimolecular quantities of saturated aliphatic linear dicarboxylic acids, having 6 to 13 C-atoms, and poly(alkylene oxide diols).

2. Copolyetheresteramides according to claim 1, comprising
   (a) 25 to 35% by weight of said acid caprolactam and/or ε-aminocaproic acid,
   (b) 15 to 25% by weight of said equimolecular mixture of adipic acid and primary aliphatic and/or cycloaliphatic $C_6$ to $C_{25}$ diamines,
   (c) 15 to 25% by weight of said equimolecular mixture of azelaic and/or sebacic acid and primary aliphatic and/or cycloaliphatic $C_6$ to $C_{25}$ diamines, and
   (d) 25 to 35% by weight of said equimolecular mixture of decanedicarboxylic and/or brassylic acid and primary aliphatic and/or cycloaliphatic $C_6$ to $C_{25}$ diamines.

3. Process for the preparation of copolyetheresteramides comprising submitting to polycondensation
   I. 65 to 90% by weight amide-forming components which include:
   (a) 20 to 40% by weight of caprolactam and/or ε-aminocaproic acid,
   (b) 10 to 30% by weight of an equimolecular mixture of adipic acid and primary aliphatic and/or cycloaliphatic $C_6$ to $C_{25}$ diamines,
   (c) 10 to 30% by weight of an equimolecular mixture of azelaic and/or sebacic acid and primary aliphatic and/or cycloaliphatic $C_6$ to $C_{25}$ diamines, and
   (d) 20 to 40% by weight of an equimolecular mixture of decanedicarboxylic and/or brassylic acid and primary aliphatic and/or cycloaliphatic $C_6$ to $C_{25}$ diamines, and II. 10 to 35% by weight polyetherester-forming component including equimolecular quantities of saturated aliphatic linear dicarboxylic acids having 6 to 13 C-atoms and poly(alkylene oxide diols).

4. Process according to claim 3, wherein
25 to 35% by weight of the caprolactam and/or ε-aminocaproic acid,
15 to 25% by weight of the equimolecular mixture of adipic acid and primary aliphatic and/or cycloaliphatic $C_6$ to $C_{25}$ diamines,
15 to 25% by weight of the equimolecular mixture of azelaic and/or sebacic acid and primary aliphatic and/or cycloaliphatic $C_6$ to $C_{25}$ diamines, and
25 to 35% by weight of the equimoleclar mixture of decanedicarboxylic and/or brassylic acidand primary aliphatic and/or cycloaliphatic $C_6$ to $C_{25}$ diamines are submitted to polycondensation.

5. Process according to claims 3 or 4, characterized in tat first the copolyamide-forming components and the satuated aliphatic linear dicarboxylic acids are reacted, with formation of a copolyamide, having terminal carboxyl groups, and the reaction product is then reacted with the poly(alkylene oxide diol), appropriately under reduced pressure.

6. Process of using the copolyetheresteramides according to claims 1 or 2 for the heat-sealing of textiles.

7. Process comprising preparation of copolyetheresteramides from caprolactam and/or ε-aminocaproic acid and other polyamide-forming monomers as amide-forming component and equimolecular quantities of saturated aliphatic linear dicarboxylic acids having 6 to 13 C-atoms and poly(alkylene oxide diols) as polyetherester-forming components,
20 to 40% by weight of caprolactam and/or ε-aminocaproic acid,
10 to 30% by weight of an equimolecular mixture of adipic acid and primary aliphatic and/or cycloaliphatic $C_6$ to $C_{25}$ diamines,
10 to 30% by weight of an equimolecular mixture of azelaic and/or sebacic acid and primary aliphatic and/or cycloaliphatic $C_6$ to $C_{25}$ diamines, and
20 to 40% by weight of an equimolecular mixture of decanedicarboxylic and/or brassylic acid and primary aliphatic and/or cycloaliphatic $C_6$ to $C_{25}$ diamines,
always related to the total quantity of the polyamide-forming components, being submitted to polycondensation, for 65 to 90% by weight of the total quantity of the polyamide-forming components, there being 10 to 35% by weight of the equimolecular quantities of saturated aliphatic linear dicarboxylic acids, having 6 to 13 C-atoms, and poly(alkylene oxide diols) as polyetherester-forming component.

8. Process according to claim 7, characterized in that first the copolyamide-forming components and the saturated aliphatic linear dicarboxylic acids are reacted, with formation of a copolyamide, having terminal carboxyl groups, and the reaction product is then reacted with the poly(alkylene oxide diol), appropriately under reduced pressure.

* * * * *